US009178335B2

(12) United States Patent
Waffler et al.

(10) Patent No.: US 9,178,335 B2
(45) Date of Patent: Nov. 3, 2015

(54) SPARK GAP ARRANGEMENT COMPRISING TWO PREFERABLY FLAT, OPPOSING ELECTRODES THAT ARE HELD APART IN A HOUSING BODY

(75) Inventors: Michael Waffler, Neumarkt (DE); Uwe Strangfeld, Nürnberg (DE)

(73) Assignee: DEHN + SÖHNE GmbH + Co. KG, Neumarkt (DE)

( * ) Notice: Subject to any disclaimer, the term of this patent is extended or adjusted under 35 U.S.C. 154(b) by 480 days.

(21) Appl. No.: 13/817,319

(22) PCT Filed: Jul. 13, 2011

(86) PCT No.: PCT/EP2011/061919

§ 371 (c)(1),
(2), (4) Date: Apr. 24, 2013

(87) PCT Pub. No.: WO2012/022548

PCT Pub. Date: Feb. 23, 2012

(65) Prior Publication Data

US 2013/0207531 A1 Aug. 15, 2013

(30) Foreign Application Priority Data

Aug. 18, 2010 (DE) ......................... 10 2010 034 668
May 31, 2011 (DE) ......................... 10 2011 102 869

(51) Int. Cl.
*H02H 1/00* (2006.01)
*H02H 1/04* (2006.01)
(Continued)

(52) U.S. Cl.
CPC .. *H01T 1/00* (2013.01); *H01T 1/02* (2013.01); *H01T 4/10* (2013.01)

(58) Field of Classification Search
CPC ... H01T 4/00–4/20; H02H 9/04; H02H 9/005; H02H 9/02; H02H 9/042; H02H 9/06; H02H 3/08; H02H 3/20; H01J 2893/0034; H01J 2893/0043; H01J 5/26; H01J 5/42
USPC .................................... 361/39, 40, 117–138; 313/231.11–231.21; 362/380
See application file for complete search history.

(56) References Cited

U.S. PATENT DOCUMENTS 5,187,634 A 2/1993 Pitsch et al. .................. 361/119

FOREIGN PATENT DOCUMENTS

DE 198 45 889 4/2000 ................ H01T 4/04

OTHER PUBLICATIONS

The International Search Report, in English, dated Oct. 17, 2011, the Written Opinion of the International Searching Authority, in English, dated Feb. 18, 2013, and the Notification Concerning Transmittal of International Preliminary Report on Patentability and the International Preliminary Report on Patentability, in English, dated Feb. 19, 2013, issued from Applicants' corresponding PCT Application No. PCT/EP2011/061919, filed Jul. 13, 2011, each of which being from the World Intellectual Property Organization (WIPO).

*Primary Examiner* — Anne Hines
*Assistant Examiner* — Jose M Diaz
(74) *Attorney, Agent, or Firm* — Gerald T. Bodner

(57) ABSTRACT

The invention relates to a spark gap arrangement comprising two preferably flat, opposing electrodes (1) that are held apart in a housing body (13), said electrodes forming an arc combustion chamber, and comprising a gas-cooling and pressure-compensating chamber that is connected to the arc combustion chamber. According to the invention, the housing body (13) is formed from two half-shells (14, 16), each of which has first recesses that lie opposite each other in one plane for electrode connecting limbs (3), said limbs being connected to a connecting terminal (15) on the outside of the housing body. Each of the half-shells (14, 16) has a first space for receiving an insulating material support (11) for the electrodes (1) and a second space for receiving a cooling block (8), which has channels, with a high heat capacity. Furthermore, a U-shaped clamp (9) that is connected to the half-shells in a mechanical and pressure-resistant manner is provided at least in the receiving region of the cooling block (8) such that said clamp encompasses the half-shells (14, 16) on the outside.

6 Claims, 6 Drawing Sheets

(51) Int. Cl.

| | |
|---|---|
| ***H02H 3/22*** | (2006.01) |
| ***H02H 9/06*** | (2006.01) |
| ***H01T 1/00*** | (2006.01) |
| ***H01T 1/02*** | (2006.01) |
| ***H01T 4/10*** | (2006.01) |

SPARK GAP ARRANGEMENT COMPRISING TWO PREFERABLY FLAT, OPPOSING ELECTRODES THAT ARE HELD APART IN A HOUSING BODY

The invention relates to a spark gap arrangement comprising two opposite, preferably flat electrodes spaced apart in a housing body, the electrodes forming an arc burning space, and a gas-cooling and pressure-compensating chamber connected to the arc burning space, according to the preamble of patent claim 1.

DE 198 45 889 B4 describes a spark gap arrangement to be used for the power supply, comprising an arcing chamber in which the arc-over takes place between two electrodes of the spark gap. An intermediate chamber is connected downstream of the arcing chamber, whose volume is substantially greater than the volume of the arcing chamber. Further, there is a connection between the arcing chamber and the intermediate chamber in the form of a pressure-tight metallic flow channel, which projects into the intermediate chamber and ends in lateral openings for the deflection of gas.

Such a solution allows an encapsulation, so that a spark gap can also be installed in places where the use of exhaust gaps is usually impossible, or possible only to a limited extent, on account of the fire hazard.

Based on the foregoing it is the object of the invention to provide a further developed spark gap arrangement which is suited for applications involving high lightning current loads and low follow currents, i.e. in particular for a circuit between N and PE, wherein the spark gap arrangement is to be realized in a non-exhaust manner and should need only a small installation space. Moreover, a possibility is to be provided to realize the stringing together of multiple like or similar spark gaps or, respectively, a through-connection and mechanical connection of corresponding spark gaps in a series arrangement in a cost-efficient and easy manner.

The solution to the object of the invention is achieved by the combination of features according to the teaching of patent claim 1. The dependent claims define at least useful embodiments and further developments.

Accordingly, there is provided a spark gap arrangement comprising two opposite, preferably flat electrodes spaced apart in a housing body, the electrodes forming an arc burning space. Further, there is provided a gas-cooling and pressure-compensating space connected to the arc burning space and formed as a corresponding pressure-compensating chamber.

According to the invention the housing body is made of two half-shells, preferably of a synthetic insulating material. The half-shells each have first recesses for electrode connection webs, the recesses being opposite in a plane. On the outside of the housing body the electrode connection webs are connected to a connection terminal known per se. This connection may be achieved by rivets or form closure. The electrode connection webs are connected to the actual electrodes, for instance, by riveting. This permits the use of the most cost-efficient material for the respective purpose.

The half-shells each have a first space for receiving an insulating material holder for the electrodes and a second space for receiving a cooling block of a high thermal capacity which comprises channels. The cooling block may be made of a metallic material and comprise corresponding meander-like channels milled or incorporated otherwise into the same for the multiple deflection of a gas and the corresponding cooling and pressure reduction.

Furthermore, a U-shaped clamp is provided, which is arranged to encompass on the outside of the half-shells at least the receiving area of the cooling block. This U-shaped clamp of a high thermal capacity is connected to the half-shells mechanically and resistant to pressure, e.g. by rivets.

Preferably on one end face, in the region which is provided for receiving the cooling block, the half-shells comprise small slots or openings so as to allow a pressure compensation. Gas flowing in the region of these small openings is cooled additionally by the U-shaped clamp and expands.

Perpendicular to the plane between the first recesses a second recess is incorporated as a through-slot in at least one of the half-shells to receive an extended connection web which is contacted with the electrode, so as to allow a threading-type stringing together and electrical contacting of multiple spark gap arrangements of this type in a very simple and mechanically stable manner.

One of the connection webs for the electrodes comprises an integral clip to receive a melting part which changes its shape at a higher temperature, wherein the molded part is subjected to a defined spring force and is operatively connected directly or indirectly to a display element so that a thermal overload can be signalized.

A trigger device is provided for the necessary setting of a lower response voltage, the trigger device being located in a recess or hollow space of the insulating material part.

The trigger device is preferably realized as a thin printed circuit board which carries the required trigger components. Furthermore, the printed circuit board has one end which projects into the spacing between the electrodes to act there as an ignition electrode or trigger electrode.

The half-shells form a flat housing body preferably of a rectangular shape, wherein the housing arrangement can be mounted into a freely configurable external housing.

The invention will be explained in more detail below by means of figures and an embodiment.

Figure 3A:
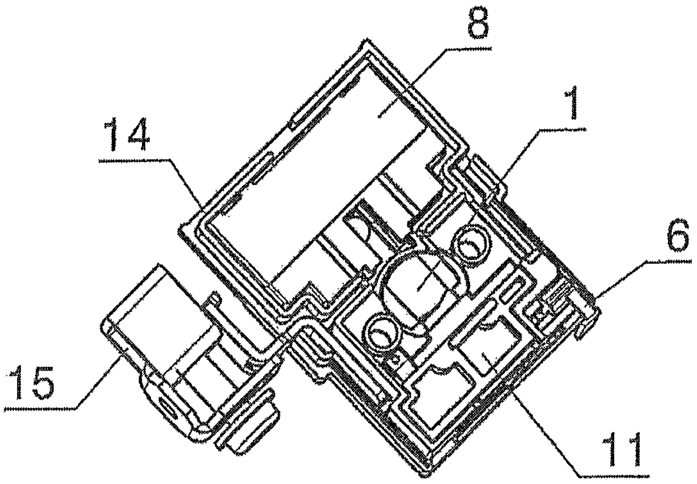
Figure 3B:
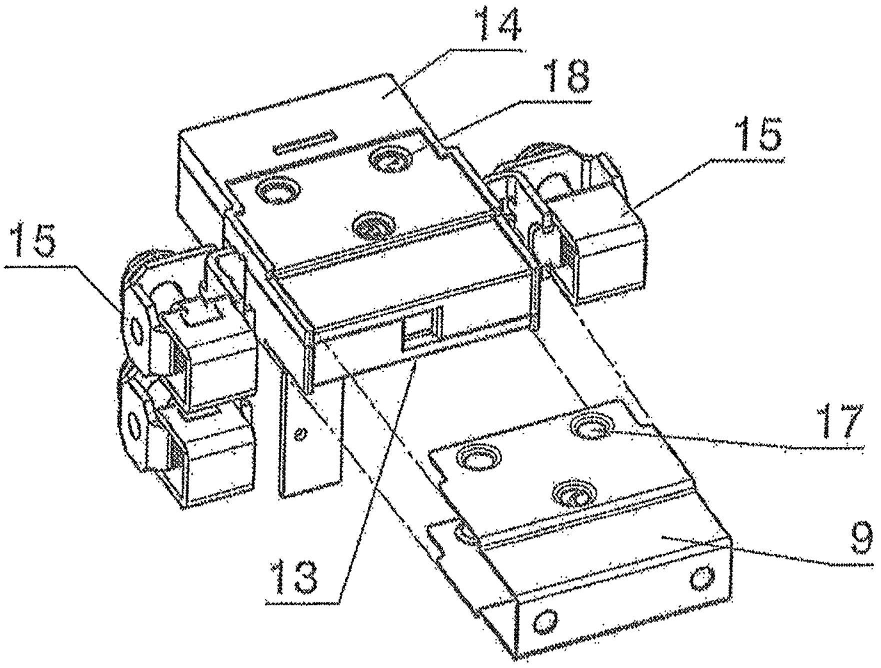
Figure 4:
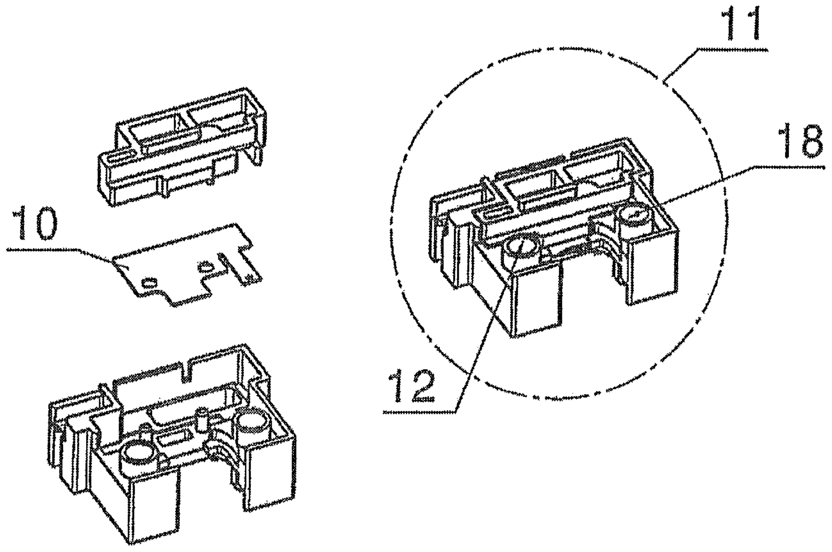
Figure 5:
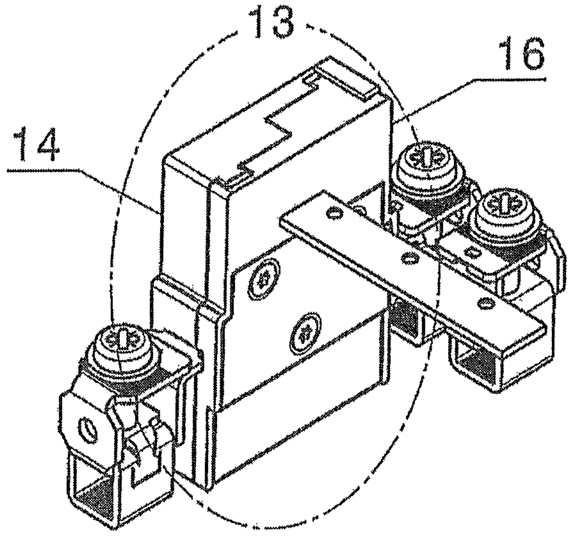

FIG. 3*a* shows an illustration of the spark gap arrangement without the upper half-shell, with a gas flow inside the cooling block which is symbolized in an arrow-type manner;

FIG. 3*b* shows an illustration similar to that of FIG. 3*a*, with a recognizable extended connection web and a U-shaped clamp which is slid on after the second half-shell part, which is still missing in FIGS. 3*a* and *b*. was mounted and is mechanically connected to the half-shells;

FIG. 4 shows a view of the insulating material holder for the electrodes with a printed circuit board insertable there as a wiring carrier for the ignition circuit; and FIG. 5 shows a fully mounted spark gap arrangement with a U-shaped clamp which fixes the half-shells of the housing body, and an extended connection web for stringing together other spark gap assemblies which can be contacted at the same time.

Figure 1:
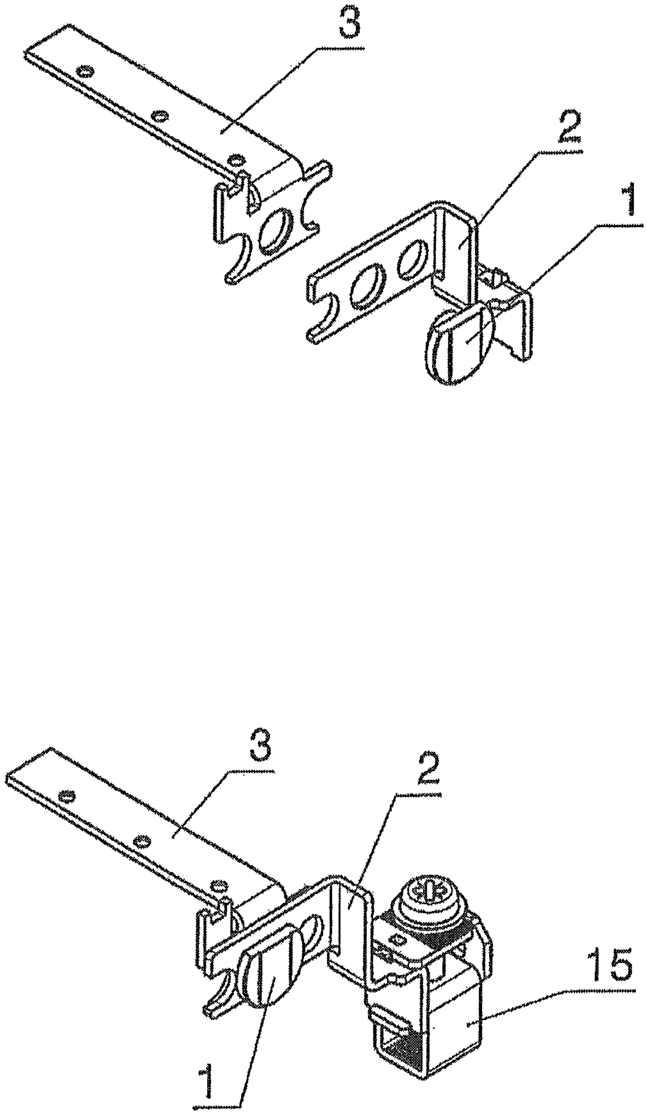
FIG. 1 shows an illustration of one of the electrodes with a connection web and contacted extended connection web as well as the state with a mechanically fixed connection terminal (right part of illustration)

As shown in FIG. 1, the spark gap comprises electrodes 1, which are connected to their respective connecting bracket 2 in a force-fit, material-bonded and/or form-fit manner.

One of the two electrodes may be connected to an extended connection web 3 so as to allow the realization of an electrical contact with and mechanical attachment to other arrester modules as is shown, for instance, in FIG. 5.

The connection webs, in particular the longer connection web 3 are/is guided in terms of geometry in such a way that despite a high current load nearly no electromagnetic force action occurs between the individual arrester modules in the case of a diversion.

Figure 2:
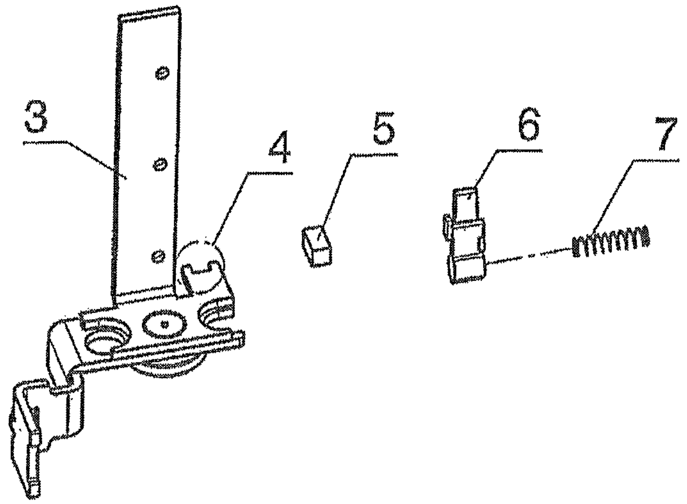
FIG. 2 shows an illustration similar to that of FIG. 1, but with a clip to receive a shape-varying melting part and a display element and a spring for applying a pressure.

FIG. 2 shows once more the pre-mounted unit comprised of electrode 1, connecting part 2 and extended connection web 3, in this case supplemented with a clip 4 which serves to receive a molded part 5 having a defined low melting temperature, e.g. a solder preform or wax pin. The molded part 5 monitors both the thermal load on the surrounding plastic parts, i.e. the half-shells or the insulating material holder 11 (see FIG. 4), and the temperature of the metallic parts.

In the event of a corresponding deformation the preloaded spring 7 moves the display slide 6.

The spark gap arrangement shown in FIGS. 3*a*. 3*b* and 5 is configured as a non-exhaust spark gap arrangement.

The pressure load is extremely reduced by the integrated cooling block 8, which is preferably made of a material having a high thermal capacity, e.g. copper, and the integrated gas deflection channels provided there. A pressure compensation still becoming necessary relative to the environment is achieved by meander-like channels of a smallest cross-section in area 13 of FIG. 3*b*.

FIGS. 3*a* and 3*b* each show a lower half-shell 14 comprising corresponding recesses both for the insulating material holder 11 and the cooling block 8. The position of the connection terminals 15 can be seen as well.

After the second, other half-shell 16 (see FIG. 5) was mounted a U-shaped clamp 9, in particular a sheet metal clamp, is slid on and connected to the half-shells by means of bore holes 17 which are complementary to recesses 18 in the half-shells and the insulating material body 11.

The U-shaped clamp 9 serves the additional cooling and extends the meander-like channels and also contributes to the pressure reduction. It is configured to be insulated from electric components.

If desired, the spark gap may be equipped with an auxiliary ignition unit correspondingly required to realize lower response voltages. e.g. in the range of 1.5 kV.

The required ignition circuit, which preferably comprises an interconnection of a varistor and a gas discharge means to trigger the internal spark gap, is located on an insulating material plate 10 which is fully integrated in the insulating material holder 11, the latter again be located in the totally pressure-resistant housing body 13.

The thin insulating material foil 10 not only serves as a carrier for the components of the auxiliary ignition circuit, but with a corresponding end extending between the electrodes also as an ignition electrode.

The bore holes 18 in the insulating material holder 11 are surrounded by domes 12 which serve to receive the connecting brackets 2 with the respective main electrodes 1. To this end, an opening is incorporated in the connection brackets which corresponds to the outer dimensions of the respective dome.

The invention claimed is:

1. Spark gap arrangement comprising two opposite, preferably flat electrodes spaced apart in a housing body, the electrodes forming an arc burning space, and a gas-cooling and pressure-compensating chamber connected to the arc burning space, characterized in that the housing body is formed of two half-shells each having first recesses for electrode connection webs, the recesses being opposite in a plane and the electrode connection webs being connected to a connection terminal on the outside of the housing body, the half-shells each have a first space for receiving an insulating material holder for the electrodes and a second space for receiving a cooling block of a high thermal capacity which comprises channels, and further a U-shaped, thermally conductive clamp is provided, which encompasses on the outside of the half-shells at least the receiving area of the cooling block and is connected to the half-shells mechanically and resistant to pressure.

2. Spark gap arrangement according to claim 1, characterized in that perpendicular to the plane between the first recesses a second recess is incorporated as a through-slot in one half-shell to receive an extended connection web which is contacted or can be contacted with the electrode so as to allow a threading-type stringing together and, at the same time, electrical contacting of further spark gap arrangements.

3. Spark gap arrangement according to claim 1, characterized in that one of the connection webs comprises an integral clip to receive a melting part which changes its shape at a high temperature, wherein the molded part is subjected to a defined spring force and is operatively connected directly or indirectly to a display element.

4. Spark gap arrangement according to claim 1, characterized in that a trigger device is provided for setting a low response voltage, which is located in a recess or hollow space of the insulating material holder.

5. Spark gap arrangement according to claim 4, characterized in that the trigger device comprises a thin printed circuit board or foil-type printed circuit board which has one end which projects into the spacing between the electrodes.

6. Spark gap arrangement according to claim 1, characterized in that the half-shells form a flat housing body preferably of a rectangular shape, wherein this housing arrangement can be mounted into a freely configurable external housing.

* * * * *